US008440966B2

(12) United States Patent
Choi et al.

(10) Patent No.: US 8,440,966 B2
(45) Date of Patent: May 14, 2013

(54) FOURIER TRANSFORM ION CYCLOTRON RESONANCE MASS SPECTROMETER USING A CRYO-DETECTION SYSTEM

(75) Inventors: Myoung Choul Choi, Ochang-myeon (KR); Yeon Suk Choi, Daejeon (KR); Jeong Min Lee, Daejeon (KR); Seung Yong Kim, Daejeon (KR); Dong Lak Kim, Daejeon (KR); Hyun Sik Kim, Daejeon (KR); Jong Shin Yoo, Daejeon (KR); Stefan Karl-Heinz Stahl, Mettenheim (DE)

(73) Assignee: Korea Basic Science Institute, Daejeon (KR)

( * ) Notice: Subject to any disclaimer, the term of this patent is extended or adjusted under 35 U.S.C. 154(b) by 653 days.

(21) Appl. No.: 12/345,250

(22) Filed: Dec. 29, 2008

(65) Prior Publication Data

US 2009/0166533 A1 Jul. 2, 2009

(30) Foreign Application Priority Data

Dec. 31, 2007 (KR) ........................ 10-2007-0141492

(51) Int. Cl.
*B01D 59/44* (2006.01)

(52) U.S. Cl.
USPC ....................... 250/291; 250/288; 219/121.63

(58) Field of Classification Search ................... 250/291
See application file for complete search history.

(56) References Cited

U.S. PATENT DOCUMENTS

| | | | | |
|---|---|---|---|---|
| 4,663,944 | A * | 5/1987 | Bernius et al. | 62/51.1 |
| 5,640,010 | A * | 6/1997 | Twerenbold | 250/281 |
| 6,720,555 | B2 * | 4/2004 | O'Connor | 250/291 |

* cited by examiner

*Primary Examiner* — Phillip A Johnston
(74) *Attorney, Agent, or Firm* — Fenwick & West LLP

(57) ABSTRACT

A Fourier transform ion cyclotron resonance mass spectrometer (FT-ICR MS) is provided. A preamplifier is installed as nearest to an ion cyclotron resonance (ICR) trap as possible at a detector part in the mass spectrometer, and thermal noise generated at the preamplifier is minimized by means of a cryo-cooling system to increase a signal-to-noise ratio of ion detection signals such that an ultra-low amount of specimen can be detected, which was impossible in the related art.

1 Claim, 2 Drawing Sheets

FOURIER TRANSFORM ION CYCLOTRON RESONANCE MASS SPECTROMETER USING A CRYO-DETECTION SYSTEM

CROSS-REFERENCE TO RELATED APPLICATION

This application claims priority under 35 U.S.C. §119(a) the benefit of Republic of Korea Patent Application No. 10-2007-141492, filed on Dec. 31, 2007, the entire contents of which are incorporated herein by reference.

BACKGROUND

1. Technical Field

Disclosed is a Fourier transform ion cyclotron resonance mass spectrometer (FT-ICR MS), in which a preamplifier is installed as nearest to an ion cyclotron resonance (ICR) trap as possible at a detector part in the mass spectrometer and thermal noise generated at the preamplifier is minimized by means of a cryo-cooling system to increase a signal-to-noise ratio of ion detection signals such that an ultra-low amount of specimen can be detected, which was impossible in the related art.

2. Description of the Related Art

Generally, an existing preamplifier that measures signals of a Fourier transform ion cyclotron resonance mass spectrometer (FT-ICR MS) as shown in FIG. 1 is used for amplifying an input signal by fine image current induced to an electrode surrounded by ions confined by high magnetic field and electric field, and it gives a great influence on a signal-to-noise ratio of the entire ion signals. In particular, thermal noise should be decreased to improve the signal-to-noise ratio.

However, in case a preamplifier used at a normal temperature is cooled to a low temperature to minimize thermal noise generally existing at a normal temperature, the preamplifier may not be operated normally as a high signal-to-noise ratio signal detection device since the design and parts of the preamplifier are optimized for the normal temperature. In addition, due to the insulation from other parts that should not be cooled, it is difficult to cool the preamplifier to a desired temperature. Also, the preamplifier should be installed together with a vacuum device such that the thermal isolation device may keep a pressure difference between the outside under an atmospheric pressure and an ultra high vacuum region where electric circuits to be cooled are located.

SUMMARY

In order to solve the above-described problems associated with the related art, there is provided a Fourier transform ion cyclotron resonance mass spectrometer (FT-ICR MS) that allows high signal-to-noise ratio measurement of signals under an ultra low temperature circumstance.

In one aspect, there is provided an FT-ICR MS using a cryo-detection system, which includes an ionization source for injecting a specimen, a mass filter for selecting and storing an ion injected to a vacuum chamber, a collision cell, an ion transmission guide for transmitting the stored ion to an ion cyclotron resonance (ICR) trap that measures a signal, a mass spectrometer a detection system comprising a cryo-preamplifier mounted in the vacuum chamber at the rear of the ICR trap and a cryo-cooling system having a cryo-cooler and a cryogen circulating tube installed out of the vacuum chamber in order to cool the cryo-preamplifier.

In the FT-ICR MS disclosed herein, the preamplifier is installed as nearest to the ICR trap as possible at a detector part in the mass spectrometer, and thermal noise generated at the preamplifier is minimized by means of a cryo-cooling system to increase a signal-to-noise ratio of ion detection signals, so that it is possible to detect an ultra-low amount of specimen, which was impossible in the related art.

BRIEF DESCRIPTION OF THE DRAWINGS

Description will now be given in detail with reference to certain example embodiments illustrated in the accompanying drawings which are given hereinbelow by way of illustration only, and thus are not limitative of the present invention.

DETAILED DESCRIPTION

Hereinafter, reference will now be made in detail to various embodiments, examples of which are illustrated in the accompanying drawings and described below.

Figure 1:
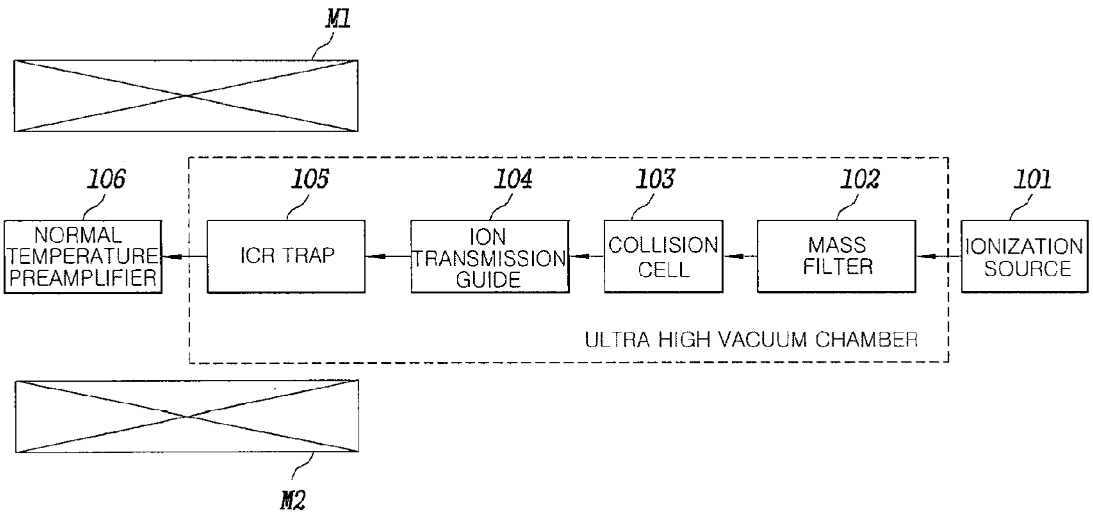
FIG. 1 is a block diagram showing a Fourier transform ion cyclotron resonance mass spectrometer (FT-ICR MS) according to a related art.
Figure 2:
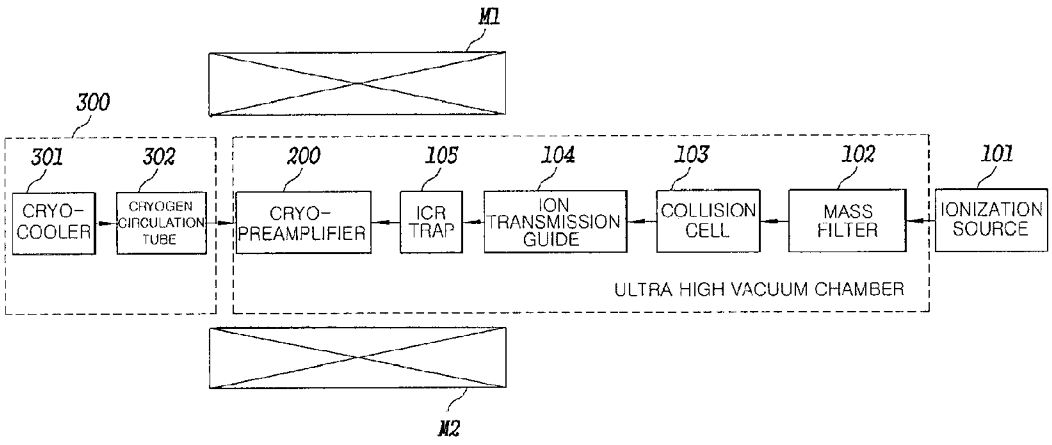
FIG. 2 is a block diagram showing an FT-ICR MS according to the present invention.

FIG. 2 shows a Fourier transform ion cyclotron resonance mass spectrometer (FT-ICR MS) disclosed herein, which includes an ionization source 101, a mass filter 102, a collision cell 103, an ion transmission guide 104, an ion cyclotron resonance (ICR) trap 105, and a cryo-detection system.

In particular, the FT-ICR MS disclosed herein includes a cryo-detection system. The cryo-detection system includes a cryo-preamplifier 200 which can be operated even at an ultra low temperature and a cryo-cooling system 300 for cooling the cryo-preamplifier 200.

The cryo-preamplifier 200 is installed near the ICR trap 105 so as to minimize a length of a connection line, thereby increasing ion signals through the reduction of parasitic capacitance ($C_{par}$).

Therefore, ion signals are increased by reducing the parasitic capacitance which is in reverse proportion to the magnitude of signal (S) as shown in the following Equation 1.

$$S = \frac{1}{\sqrt{2}} \frac{r_{ion}}{D} \frac{q}{C_{par}} \quad \text{Equation 1}$$

Here, D is a diameter of the ICR trap, $r_{ion}$ is a radius of an ion located in the ICR trap, q is an electric charge of the ion, and $C_{par}$ is a parasitic capacitance of an input line including an electrode and a signal line.

The cryo-cooling system 300 includes a cryo-cooler 301 and a cryogen circulating tube 302, and it cools the cryo-preamplifier 200 installed in an ultra high vacuum chamber.

Figure 3:
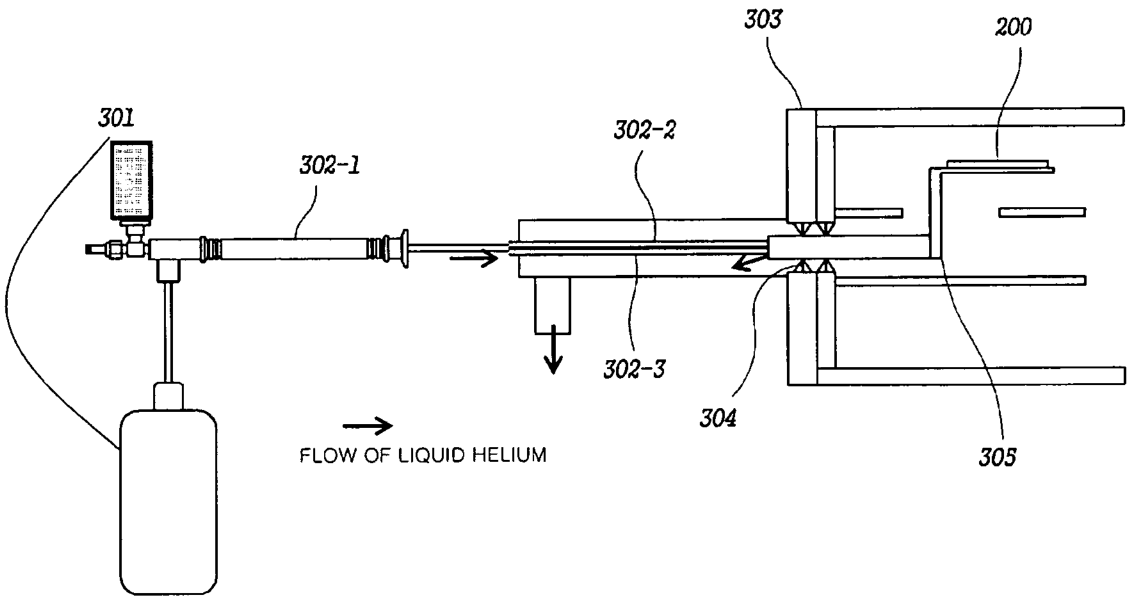
FIG. 3 shows an embodiment of a cryo-cooling system of FIG. 2.

FIG. 3 shows an example of the cryo-cooling system disclosed herein, which includes a cryo-cooler 301, a cryogen circulating tube 302-1, an input tube 302-2, and an output tube 302-3. The cryo-cooler 301 is used to circulate cryogen through the circulating tube 302-1, thereby cooling the cryo-preamplifier 200 in the ultra high vacuum chamber.

Also, a cryo-cooling flange 303 is additionally provided to separate an ultra high vacuum region from an atmospheric pressure space and also separate a normal temperature flange from the cryogen circulating tube 302 at an ultra low temperature of 4 K or below, thereby improving ion signal sensitivity of the FT-ICR MS.

In addition, a welding fixing unit 304 is provided to mechanically fix the cryo-cooling flange 303 and the cryogen circulating tube 302. A high vacuum region of about $1\times10^{-10}$ Torr and a low vacuum region of about $1\times10^{-4}$ Torr prepared for thermal isolation need to be maintained. So, all gaps are sealed using a ring-shaped connector.

The welding fixing unit 304 located at a relatively far distance from the connector with a thermally conductive cooling copper rod 305 has a minimized contact surface, so relatively less heat penetrates there. Thus, by vacuum-welding the gap, vacuum and mechanical fixing can be maintained together.

It would be appreciated by those having ordinary skill in the art that various changes and modifications can be made without departing from the principles and spirit of the invention, so the invention is not limited to the above embodiments and accompanying drawings.

What is claimed is:

1. A Fourier transform ion cyclotron resonance mass spectrometer (FT-ICR MS) using a cryo-detection system, which includes an ionization source for injecting a specimen, a mass filter for selecting and storing an ion injected into a vacuum chamber, a collision cell, and an ion transmission guide for transmitting the stored ion to an ion cyclotron resonance (ICR) trap that measures a signal, the mass spectrometer comprising:

a detection system comprising a cryo-preamplifier mounted in the vacuum chamber at the rear of the ICR trap, a cryo-cooling system including a cryo-cooler, a cryogen circulating tube installed out of the vacuum chamber in order to cool the cryo-preamplifier, an input tube and an output tube, the cryogen circulating tube disposed at a temperature of 4K or below, a cryo-cooling flange provided at a rear end of the vacuum chamber and separating the vacuum chamber from a region out of the vacuum chamber and thermally isolating the vacuum chamber from the cryogen circulating tube, and a welding fixing unit provided between the cryo-cooling flange and the input tube and the output tube, the welding fixing unit having a contact surface so as to minimize heat transfer through the welding fixing unit, wherein the input tube and the output tube extend through the cryo-cooling flange and are in thermal contact with the cryo-preamplifier.

* * * * *